(12) United States Patent
Nakayama

(10) Patent No.: US 8,497,460 B2
(45) Date of Patent: Jul. 30, 2013

(54) SOLID-STATE IMAGE SENSOR HAVING A CONTROL UNIT CONTROLLING A SELECTION TRANSISTOR DURING A RESET PERIOD OF A RESET TRANSISTOR

(75) Inventor: Satoshi Nakayama, Sagamihara (JP)

(73) Assignee: Nikon Corporation, Tokyo (JP)

( * ) Notice: Subject to any disclaimer, the term of this patent is extended or adjusted under 35 U.S.C. 154(b) by 300 days.

(21) Appl. No.: 13/150,925

(22) Filed: Jun. 1, 2011

(65) Prior Publication Data

US 2011/0297814 A1 Dec. 8, 2011

(30) Foreign Application Priority Data

Jun. 7, 2010 (JP) ................................. 2010-130023

(51) Int. Cl.
*H01L 27/00* (2006.01)
(52) U.S. Cl.
USPC ................................... 250/208.1; 250/214 R
(58) Field of Classification Search
USPC .................. 250/208.1, 214 R; 348/241–243, 348/294–308, 572; 257/440–444, 426, 290–292
See application file for complete search history.

(56) References Cited

U.S. PATENT DOCUMENTS

| 8,222,709 B2 * | 7/2012 | Oike et al. ................... 257/443 |
| 2005/0062867 A1 | 3/2005 | Mabuchi | |

| 2006/0175536 A1 | 8/2006 | Kim et al. |
| 2007/0108546 A1 | 5/2007 | Furuichi |
| 2009/0189234 A1 | 7/2009 | Mabuchi |
| 2009/0201405 A1 | 8/2009 | Mori et al. |
| 2009/0219410 A1 | 9/2009 | Hsu et al. |

FOREIGN PATENT DOCUMENTS

| EP | 1 965 585 A2 | 9/2008 |
| JP | A-2005-86595 | 3/2005 |
| JP | A-2007-165864 | 6/2007 |
| JP | A-2008-294218 | 12/2008 |
| JP | A-2009-33316 | 2/2009 |

OTHER PUBLICATIONS

European Search Report issued in Application No. 11 16 8772; Dated Nov. 28, 2011.
Apr. 10, 2012 Notification of Reasons for Refusal issued in Japanese Patent Application No. 2010-130023 (with translation).

\* cited by examiner

*Primary Examiner* — Que T Le
(74) *Attorney, Agent, or Firm* — Oliff & Berridge, PLC

(57) ABSTRACT

A solid-state image sensor has a pixel, a vertical signal line, and a control unit. The pixel has a photoelectric conversion part, a charge-voltage conversion part, a transfer transistor, an amplifying transistor, a selection transistor which selects whether or not to output a signal, and a reset transistor which resets a charge of the charge-voltage conversion part. The charge-voltage conversion part is connected to the amplifying transistor and the reset transistor by connection wiring. To the vertical signal line, a signal output from the amplifying transistor is transmitted. The control unit controls the reset transistor and the selection transistor so that the selection transistor is in the on state when the reset transistor changes from the on state to the off state during the reset period in which a charge of the photoelectric conversion part is reset.

8 Claims, 9 Drawing Sheets

SOLID-STATE IMAGE SENSOR HAVING A CONTROL UNIT CONTROLLING A SELECTION TRANSISTOR DURING A RESET PERIOD OF A RESET TRANSISTOR

CROSS REFERENCE TO RELATED APPLICATION

This application is based upon and claims the benefit of priority from Japanese Patent Application No. 2010-130023, filed on Jun. 7, 2010, the entire contents of which are incorporated herein by reference.

BACKGROUND

1. Field

The present application relates to a solid-state image sensor.

2. Description of the Related Art

In general, in an imaging apparatus such as a digital camera, a solid-state image sensor of CCD type or CMOS type is used. For example, a solid-state image sensor of CMOS type has a plurality of pixels arranged in the form of a two-dimensional matrix. For example, a pixel has a photoelectric conversion part such as a photodiode, which generates a signal charge according to the amount of incident light, a transfer transistor, an amplifying transistor, a reset transistor, and a selection transistor. The drain of the transfer transistor is connected to the gate of the amplifying transistor and functions as a floating diffusion region that accumulates signal charges generated in the photodiode.

A pixel signal is output to a vertical signal line provided in each column for each row during the read period. For example, during the read period, the selection transistor in the row to be read turns on. Then, in the pixel in the row where the selection transistor is in the on state, first, the reset transistor turns on for a fixed period of time and charges in the floating diffusion region are reset. Next, the transfer transistor turns on and the signal charges generated in the photodiode are transferred to the floating diffusion region. A signal voltage based on the charges transferred to the floating diffusion region is output to the vertical signal line by the amplifying transistor that operates as a source follower circuit.

In recent years, a solid-state image sensor in which an amplifying transistor, a reset transistor, and a selection transistor are shared by two pixels arranged in the direction of the column is proposed (for example, see Japanese Unexamined Patent Application Publication No. 2007-165864). In this kind of solid-state image sensor, for example, the drains (a part of the floating diffusion region) of the transfer transistors of two pixels that share the amplifying transistor etc. are connected to each other by wiring such as a metal and shared by the two pixels. In general, the wiring that connects the drains of the transfer transistors of two pixels arranged in the direction of the column is arranged parallel to the vertical signal line.

During the read period, when the selection transistor turns on, a current flows to the vertical signal line from a power supply via the amplifying transistor and the selection transistor. Because of this, the voltage of the vertical signal line rises. Then, by the coupling of the vertical signal line and the floating diffusion region, the voltage of the floating diffusion region rises. The voltage of the floating diffusion region also rises by the coupling of the gate of the selection transistor and the floating diffusion region.

In particular, in the solid-state image sensor in which the wiring in the floating diffusion region is arranged parallel to the vertical signal line (for example, a solid-state image sensor in which two pixels share an amplifying transistor etc.), the influence of the coupling of the vertical signal line and the floating diffusion region becomes great and the rise in the voltage of the floating diffusion region becomes large.

When the voltage of the floating diffusion region rises, there is a possibility that the voltage between gate and source of the reset transistor does not become a threshold voltage or more when the gate of the reset transistor is set to a high level. In this case, the reset transistor does not operate normally, and thus the charges in the floating diffusion region are not reset and the operation range of the amplifying transistor deviates from the normal operation range. For example, when the reset transistors of a plurality of pixels do not operate normally, the voltages of the floating diffusion region vary in the plurality of pixels, and as a result of that, the output characteristic of the amplifying transistor vary in the plurality of pixels. In this case, dark shading or fixed pattern noise occurs in an image.

SUMMARY

A proposition of the present embodiment is to reduce dark shading or fixed pattern noise.

A solid-state image sensor has a pixel including a photoelectric conversion part, a charge-voltage conversion part, a transfer transistor, an amplifying transistor, a selection transistor, and a reset transistor, a vertical signal line which transmits a signal output from the amplifying transistor, and a control unit. The photoelectric conversion part converts light into a charge. The charge-voltage conversion part converts the charge transferred from the photoelectric conversion part into a voltage. The transfer transistor transfers the charge of the photoelectric conversion part to the charge-voltage conversion part. The amplifying transistor generates a signal based on a voltage of the charge-voltage conversion part. The selection transistor selects whether or not to output a signal from the amplifying transistor. The reset transistor resets a charge of the charge-voltage conversion part. The charge-voltage conversion part is connected to the amplifying transistor and the reset transistor by connection wiring. The control unit controls the reset transistor and the selection transistor so that the selection transistor is in the on state when the reset transistor changes from the on state to the off state during a reset period in which a charge of the photoelectric conversion part is reset.

DETAILED DESCRIPTION OF THE EMBODIMENTS

Hereinafter, embodiments of the present invention are explained using the drawings. For signal lines through which control signals (transfer signal TX, selection signal SEL, reset signal RST, etc.) are transmitted, the same symbols as those of the control signals are used.

Figure 1:
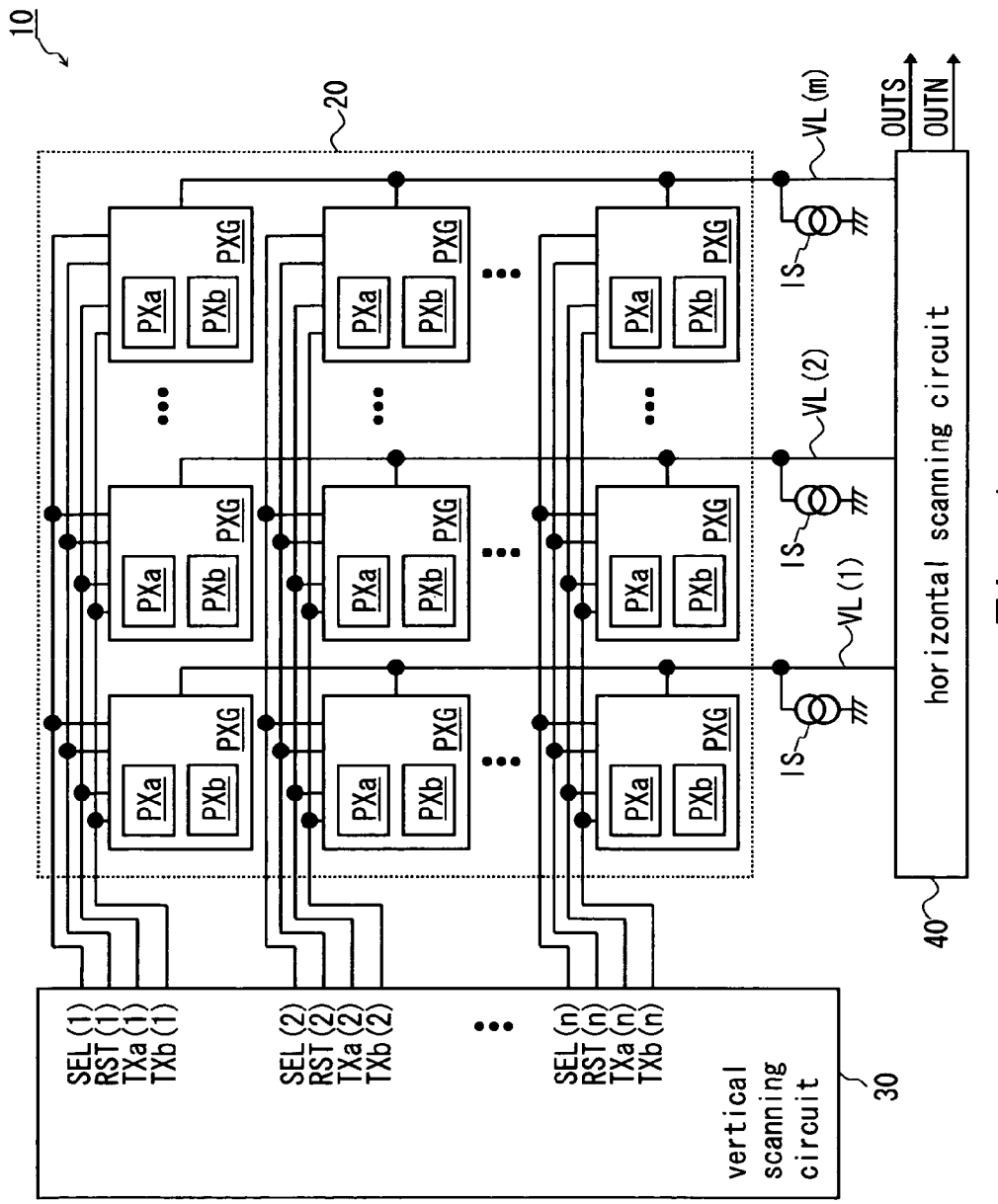
FIG. 1 is a diagram showing an outline of a solid-state image sensor in an embodiment.

FIG. 1 shows an embodiment of the present invention. A solid-state image sensor 10 in the embodiment is, for example, a solid-state image sensor of CMOS type and has a pixel array 20, a vertical scanning circuit 30, a horizontal scanning circuit 40, a constant current source IS, and a vertical signal line VL.

The pixel array 20 has a plurality of pixels PX (PXa and PXb) arranged in the form of a two-dimensional matrix. For example, each pixel PX generates an electric signal according to the amount of incident light. It should be noted that in the embodiment, the two pixels PXa and PXb adjacent to each other in the direction of the column (in the longitudinal direction in FIG. 1) constitute a pixel group PXG. For example, the pixel group PXG is arranged in n rows and m columns. In this case, the pixels PX are arranged in (2×n) rows and m columns. Details of the pixels PXa and PXb constituting the pixel group PXG are explained in FIG. 2 to be described later. A plurality of the pixel groups PXG arranged in the direction of the column is connected to the vertical signal line VL provided in each column. Moreover, to each vertical signal line VL, the constant current source IS is connected to read a signal from each pixel PX.

The vertical scanning circuit 30 controls the pixel PX in the pixel array 20 for each row using a selection signal SEL, a reset signal RST, and a transfer signal TX (TXa and TXb). Hereinafter, the selection signal SEL, the reset signal RST, and the transfer signal TX are also referred to as control signals SEL, RST, and TX, respectively. It should be noted that the control signals SEL and RST are shared by the pixels PXa and PXb constituting the pixel group PXG.

For example, a selection signal SEL(n) and a reset signal RST(n) represent the selection signal SEL and the reset signal RST in the pixel group PXG in the n-th row, respectively. That is, the selection signal SEL(n) is shared by the pixel PX in the (2×n−1)th and (2×n)th rows. Furthermore, the reset signal RST(n) is shared by the pixel PX in the (2×n−1)th and (2×n)th rows. It should be noted that a transfer signal TXa(n) is the transfer signal TX in the pixel PX in the (2×n−1)th row (the pixel PXa in the pixel group PXG in the n-th row). Then, a transfer signal TXb(n) is the transfer signal TX in the pixel PX in the (2×n)th row (the pixel PXb in the pixel group PXG in the n-th row).

Consequently, the vertical scanning circuit 30 controls, for example, the control signals SEL(1), RST(1), and TXa(1) and controls the pixel PX in the first row (the pixel PXa in the pixel group PXG in the first row). Furthermore, the vertical scanning circuit 30 controls, for example, the control signals SEL(1), RST(1), and TXb(1) and controls the pixel PX in the second row (the pixel PXb in the pixel group PXG in the first row).

The horizontal scanning circuit 40 accumulates signals OUTS and OUTN of the pixel PX in the row selected by the vertical scanning circuit 30 and sequentially outputs the accumulated signals OUTS and OUTN for each column. Here, the signal OUTN is, for example, a noise signal indicative of a fixed noise component including a reset noise component etc. of the pixel PX. The signal OUTS is a pixel signal including the fixed noise component of the reset noise component etc. of the pixel PX and a signal component according to the charges generated in the photoelectric conversion part within the pixel PX.

Figure 2:
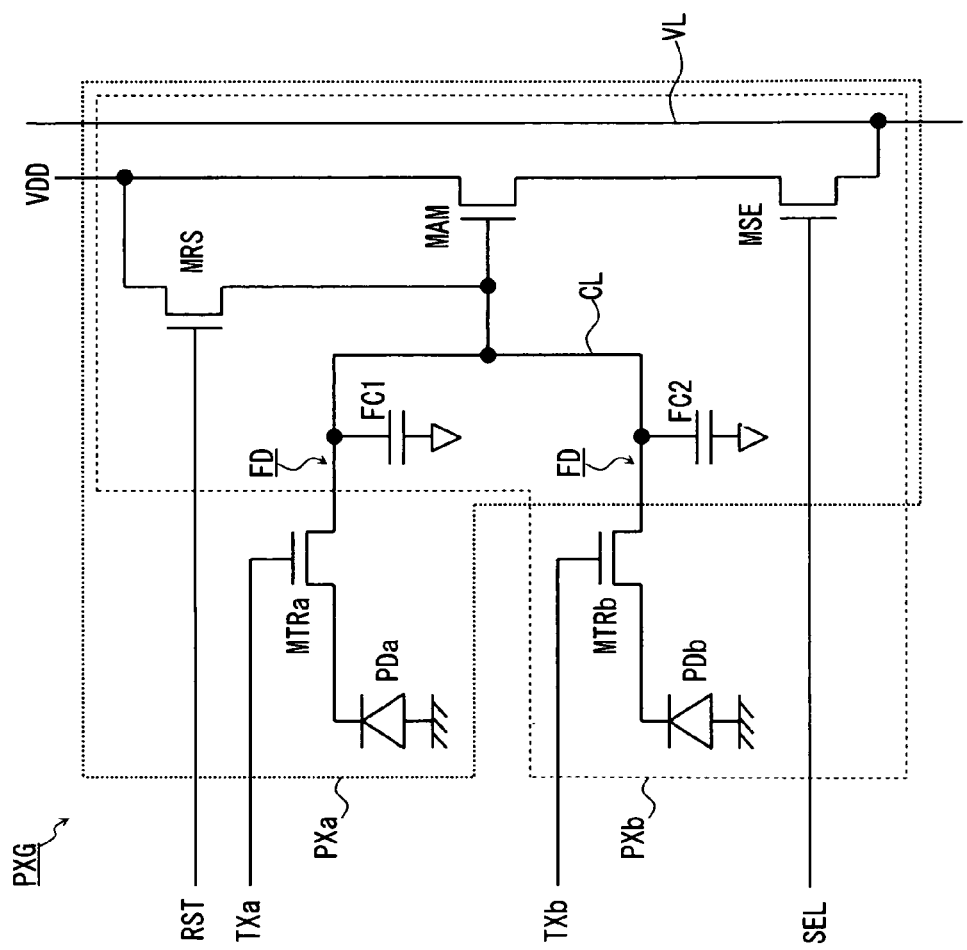
FIG. 2 is a diagram showing an example of pixels shown in FIG. 1.

FIG. 2 shows an example of the pixels PX shown in FIG. 1. Meanwhile, FIG. 2 shows an example of the pixels PXa and PXb constituting the pixel group PXG. For example, the pixel group PXG has two the pixels PXa and PXb adjacent to each other in the direction of the column (in the longitudinal direction in FIG. 2). It should be noted that in the embodiment, transistors MTRa, MTRb, MAM, MSE, and MRS formed within the pixel PX (PXa and PXb) are all nMOS transistors.

The pixel PXa has a photoelectric conversion part PDa, the transfer transistor MTRa, the amplifying transistor MAM, the selection transistor MSE, the reset transistor MRS, and a floating diffusion FD (floating diffusion region). In addition, the pixel PXb has a photoelectric conversion part PDb, the transfer transistor MTRb, the amplifying transistor MAM, the selection transistor MSE, the reset transistor MRS, and a floating diffusion FD. As described above, the amplifying transistor MAM, the selection transistor MSE, the reset transistor MRS, and the floating diffusion FD are shared by the pixels PXa and PXb.

Here, the floating diffusion FD is a region in which capacitors FC1, FC2, etc. that accumulate charges transferred from a photoelectric conversion part PD are formed (in the drain region etc. of the transistors MTRa and MTRb). It should be noted that the capacitor FC1 in the diagram represents a capacitor formed in the drain region of the transfer transistor MTRa in the pixel PXa and the capacitor FC2 represents a capacitor formed in the drain region of the transfer transistor MTRb in the pixel PXb. For example, the drain (the capacitor FC1) of the transfer transistor MTRa is connected to the drain (the capacitor FC2) of the transfer transistor MTRb by wiring CL. Because of this, the floating diffusion FD is shared by the pixels PXa and PXb.

The photoelectric conversion part PD is, for example, the photodiode PD and generates a signal charge according to the amount of incident light. Hereinafter, the photoelectric conversion part PD is also referred to as the photodiode PD. For example, in the pixel PXa, the anode of the photodiode PDa is grounded and the cathode is connected to the source of the transfer transistor MTRa. The signal charge generated by the photodiode PDa is transferred to the floating diffusion FD via the transfer transistor MTRa. The signal charge transferred to the floating diffusion FD is accumulated in the capacitors FC1, FC2, etc., and converted into a voltage. In this manner, the floating diffusion FD functions as a charge-voltage conversion part that converts the charge transferred from the photoelectric conversion part PD into a voltage.

The transfer transistor MTRa turns on during the period during which the transfer signal TXa to be applied to the gate is at the high level and transfers the signal charge accumulated in the photodiode PDa to the floating diffusion FD. It should be noted that the drain of the transfer transistor MTRa is connected to the drain of the transfer transistor MTRb, the gate of the amplifying transistor MAM, and the source of the reset transistor MRS by the wiring CL. That is, the drain of the transfer transistor MTRa, the drain of the transfer transistor MTRb, the gate of the amplifying transistor MAM, and the source of the reset transistor MRS are connected to one another.

The source of the amplifying transistor MAM is connected to the drain of the selection transistor MSE, the drain is connected to a power supply VDD, and the gate is connected to the drain of the transfer transistor MTR (MTRa and MTRb). That is, the voltage of the floating diffusion FD is input to the gate of the amplifying transistor MAM. Then, the amplifying transistor MAM outputs from the source, for example, a voltage which is the gate voltage being reduced by a threshold voltage of the amplifying transistor MAM. In this manner, the amplifying transistor MAM generates a pixel signal based on the signal charge transferred to the floating diffusion FD.

The source of the selection transistor MSE is connected to the vertical signal line VL, the drain is connected to the source of the amplifying transistor MAM, and the gate receives the selection signal SEL. For example, the selection transistor MSE turns on during the period during which the selection signal SEL is at the high level and brings the source of the amplifying transistor MAM and the vertical signal line VL into conduction. Consequently, during the period during which the selection transistor MSE is turned on, the amplifying transistor MAM, the selection transistor MSE, and the constant current source (the constant current source IS shown in FIG. 1) connected to the vertical signal line VL constitute the source follower circuit. Because of this, the signal of the pixel PX selected by the selection transistor MSE is output to the vertical signal line VL. In the manner, the selection transistor MSE selects whether or not to output the signal from the amplifying transistor MAM based on the selection signal SEL. It should be noted that the selection signal SEL is shared by the pixels PXa and PXb constituting the pixel group PXG.

The source of the reset transistor MRS is connected to the gate of the amplifying transistor MAM, the drain is connected to the power supply VDD, and the gate receives the reset signal RST. For example, the reset transistor MRS turns on during the period during which the reset signal RST is at the high level and resets the charges of the floating diffusion FD (charges accumulated in the capacitors FC1, FC2, etc.). That is, the reset transistor MRS resets the voltage of the floating diffusion FD during the period during which the reset signal RST is at the high level. It should be noted that the reset signal RST is shared by the pixels PXa and PXb constituting the pixel group PXG.

In the pixel PXb, the anode of the photodiode PDb is grounded and the cathode is connected to the source of the transfer transistor MTRb. For example, the transfer transistor MTRb turns on during the period during which the transfer signal TXb to be applied to the gate is at the high level and transfers the signal charges accumulated in the photodiode PDb to the floating diffusion FD. The signal charges transferred to the floating diffusion FD are accumulated in the capacitors FC1, FC2, etc.

Figure 3:
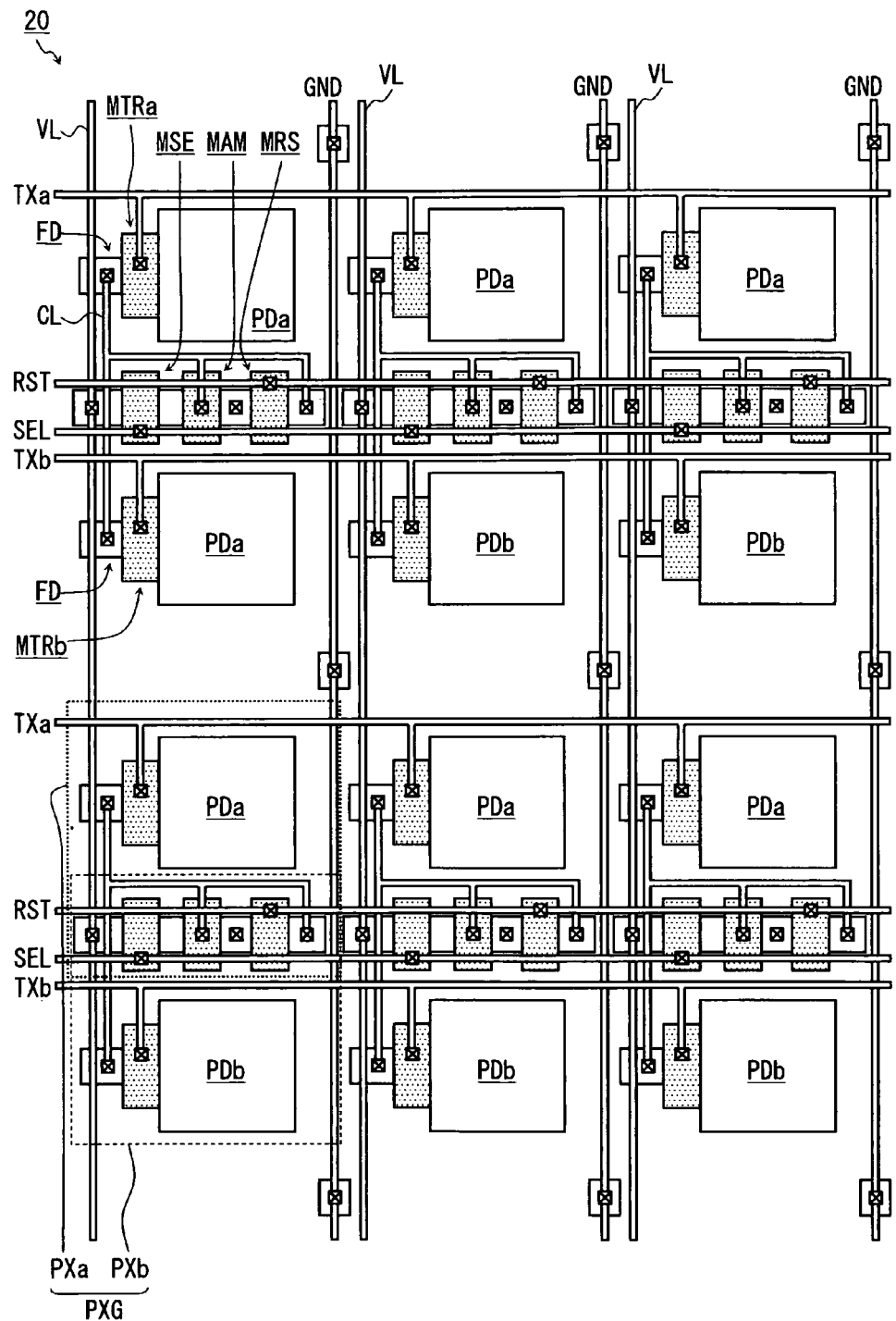
FIG. 3 is a diagram showing an example of a layout of the pixels shown in FIG. 2.

FIG. 3 shows an example of the layout of the pixels PX shown in FIG. 2. Meanwhile, FIG. 3 shows a region corresponding to four longitudinal pixels×three transverse pixels. The hatched part in the diagram represents the gate of the transistor and the rectangle attached with the x mark represents a contact region. Meanwhile, in FIG. 3, in order to make the diagram easier-to-see, the description of the wiring of the power supply VDD to be connected to the drains of the transistors MAM and MRS is omitted. In the example in FIG. 3, the two pixels PXa and PXb neighboring in the longitudinal direction constitute the pixel group PXG.

The selection transistor MSE, the amplifying transistor MAM, and the reset transistor MRS shared by the pixels PXa and PXb are arranged, for example, between the photodiode PDa in the pixel PXa and the photodiode PDb in the pixel PXb. Then, the selection transistor MSE, the amplifying transistor MAM, and the reset transistor MRS are arranged in the transverse direction in the diagram.

For example, the drain of the selection transistor MSE and the source of the amplifying transistor MAM share a diffusion region (region between the gates of the transistors MSE and MAM) and are connected to each other. Furthermore, the drain of the amplifying transistor MAM and the drain of the reset transistor MRS share the diffusion region (region between the gates of the transistors MAM and MRS) and are connected to each other. It should be noted that the drain of the amplifying transistor MAM and the drain of the reset transistor MRS are connected to the wiring (not shown schematically) of the power supply VDD via the contact region (the rectangle attached with the x mark between the gates of the transistors MAM and MRS).

A selection signal line SEL through which the selection signal SEL is transmitted is provided in each row of the pixel group PXG and connected to the gate of the selection transistor MSE arranged in the direction of the row (transverse direction in FIG. 3). Moreover, a rest signal line RST through which the reset signal RST is transmitted is provided in each row of the pixel group PXG and connected to the gate of the reset transistor MRS arranged in the direction of the row.

The transfer transistors MTRa and MTRb are arranged adjacent to the photodiodes PDa, PDb, respectively. It should be noted that the source of the transfer transistor MTR and the cathode of the photodiode PD share the diffusion region and are connected to each other. Then, a transfer signal line TX through which the transfer signal TX is transmitted is provided in each row of the pixel PX and connected to the gate of the transfer transistor MTR arranged in the direction of the row. For example, a transfer signal line TXa through which the transfer signal TXa is transmitted is connected to the gate of the transfer transistor MTRa arranged in the direction of the row. Then, a transfer signal line TXb through which the transfer signal TXb is transmitted is connected to the gate of the transfer transistor MTRb arranged in the direction of the row.

The drains of the transfer transistors MTRa and MTRb are commonly connected to the gate of the amplifying transistor MAM by the wiring CL. For example, the wiring CL connects the drain of the transfer transistor MTRa, the drain of the transfer transistor MTRb, the gate of the amplifying transistor MAM, and the source of the reset transistor MRS to one another. That is, the pixels PXa and PXb have the wiring CL that connects the floating diffusion FD (for example, the drain of the transfer transistor MTR) to the gate of the amplifying transistor MAM and the source of the reset transistor MRS.

A part of the wiring CL is arranged adjacent to and parallel to the vertical signal line VL that extends in the direction of the column (in the longitudinal direction in FIG. 3). For example, in the pixel group PXG, the wiring CL of the part that connects the drains (diffusion regions) of the transfer transistors MTRa and MTRb to each other is arranged adjacent to and parallel to the vertical signal line VL. It should be noted that the vertical signal line VL is connected to the source of the selection transistor MSE arranged in the direction of the column. Furthermore, the wiring of a ground voltage GND is arranged parallel to the vertical signal line VL. For example, on one of the sides of the vertical signal line VL, the wiring CL is arranged and on the other side of the vertical signal line VL, the wiring of the ground voltage GND is arranged.

In the embodiment, the vertical signal line VL is connected to the source of the selection transistor MSE in the pixel PX having the wiring CL adjacent to the vertical signal line VL. Here, for example, when the amplifying transistor MAM is operating as a source follower circuit, the variation in voltage of the floating diffusion FD is transmitted to the vertical signal line VL as it is. Because of this, when the amplifying transistor MAM is operating as a source follower circuit, the coupling capacitance of the wiring CL and the vertical signal line VL is reduced apparently.

For example, the floating diffusion FD has the capacitors (the capacitors FC1 and FC2 shown in FIG. 2) formed in the drain of the transfer transistor MTR, the coupling capacitance of the wiring CL and another wiring, a capacitor formed in the source of the reset transistor MRS, etc. Consequently, if the coupling capacitance of the wiring CL and the vertical signal line VL is reduced apparently, the apparent capacitance of the floating diffusion FD is reduced. For example, the apparent capacitance of the floating diffusion FD corresponds to the amount of change in charge to the amount of change in voltage of the floating diffusion FD.

In contrast to this, for example, in the configuration in which the power supply wiring (wiring of the ground voltage GND etc.) is arranged between the wiring CL and the vertical signal line VL to reduce the coupling capacitance of the wiring CL and the vertical signal line VL, the coupling capacitance of the wiring CL and the power supply wiring is formed. Because the voltage of the power supply wiring is maintained constant, even when the amplifying transistor MAM is operating as a source follower circuit, the coupling capacitance of the wiring CL and the power supply wiring functions as a part of the capacitance of the floating diffusion FD. Consequently, the apparent capacitance of the floating diffusion FD becomes large compared with the configuration (configuration shown in FIG. 3) in which a part of the wiring CL is arranged adjacent to and parallel to the vertical signal line VL.

For example, when the capacitance of the floating diffusion FD is large, the amount of change in voltage to the amount of charge (amount of change in charge) to be transferred to the floating diffusion FD is small. That is, when the capacitance of the floating diffusion FD is large, the conversion gain when the charge transferred from the photodiode PD to the floating diffusion FD is converted into a voltage (hereinafter, also referred to as the conversion gain of the floating diffusion FD) becomes small. It should be noted that in the embodiment, when the amplifying transistor MAM is operating as a source follower circuit, the apparent capacitance of the floating diffusion FD can be reduced, and thus it is possible to increase the conversion gain of the floating diffusion FD. Because of this, in the embodiment, it is possible to make large the pixel signal of the pixel PX (output signal of the amplifying transistor MAM) and to increase the SN ratio. As a result of this, the image quality is improved.

Figure 4:
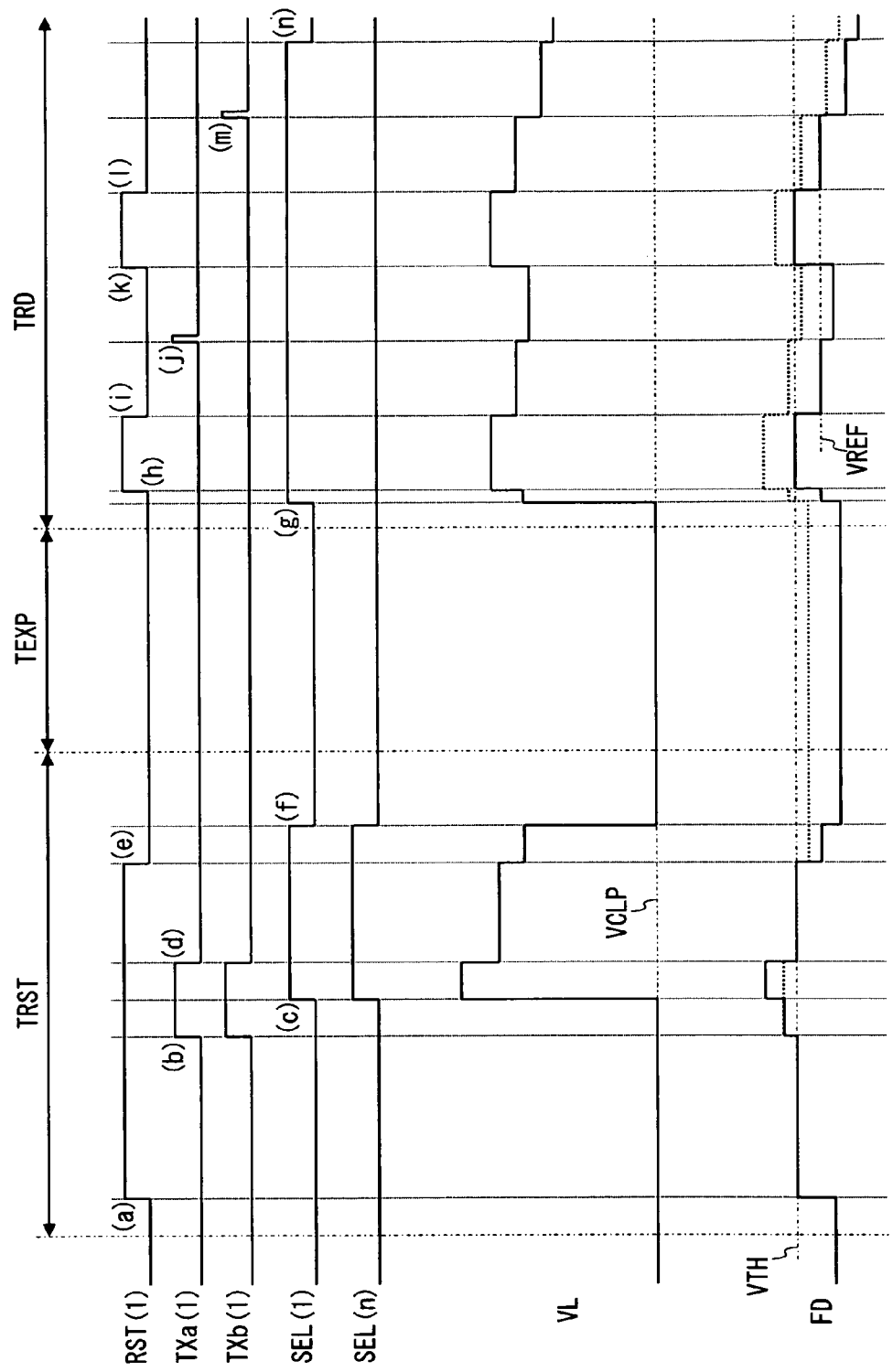
FIG. 4 is a diagram showing an example of the operation of the solid-state image sensor shown in FIG. 1.

FIG. 4 shows an example of the operation of the solid-state image sensor 10 shown in FIG. 1. Meanwhile, in FIG. 4, the description of the control signals RST, TX, SEL other than control signals RST(1), TXa(1), TXb(1), and SEL(1) in the pixel group PXG in the first row and the control signal SEL(n) in the pixel group PXG in the n-th row are omitted. Furthermore, FIG. 4 shows the voltage of the vertical signal line VL and the floating diffusion FD corresponding to a target one of the pixel groups PXG. Meanwhile, the waveform of the broken line in the diagram shows the voltage of the floating diffusion FD when the selection signal SEL is maintained at the low level during a reset period TRST as a comparative example.

The reset period TRST is a period during which the charges of the photodiode PD in all the pixels constituting a photographic image are reset. An exposure period TEXP is a period during which, for example, a mechanical shutter is opened and the photodiode PD is exposed. Then, a read period TRD is a period during which the signal of the pixel PX is read for each row.

During the rest period TRST, first, in the state where the transfer signal TX and the selection signal SEL in all the rows are maintained at the low level, the reset signal RST of the pixel PX in all the rows changes from the low level to the high level (FIG. 4(a)). Because of this, the reset transistor MRS in all the pixels PX turns on.

As a result of the reset transistor MRS in all the pixels PX turning on, the charges of the floating diffusion FD in all the pixels PX are reset and the voltage of the floating diffusion FD in all the pixels PX is maintained at a voltage VTH. Meanwhile, the voltage VTH is a voltage which is the high level of the reset signal RST being reduced by the threshold voltage of the reset transistor MRS, and an upper limit value under which the reset transistor MRS is turned on. For example, when the voltage of the floating diffusion FD is higher than the voltage VTH, the reset transistor MRS does not turn on even if the reset signal RST is at the high level.

Because the selection signal SEL in all the rows is maintained at the low level, the selection transistor in all the pixel PX is turned off. Because of this, the voltage of the vertical signal line VL is clipped at a voltage VCLP so as not to drop below the minimum voltage that can cause, for example, the constant current source IS shown in FIG. 1 to operate.

Next, the transfer signal TX in all the rows changes from the low level to the high level (FIG. 4(b)) and the transfer transistor MTR in all the pixels PX turns on. Because of this, the charges of the photodiode PD in all the pixels PX are transferred from the photodiode PD to the floating diffusion FD and reset. It should be noted that when the transfer signal TX changes from the low level to the high level, the voltage of the floating diffusion FD rises due to the coupling of the transfer signal line TX and the floating diffusion FD. Meanwhile, in the explanation of FIG. 4, the transfer signal line TX includes, for example, the gate of the transfer transistor MTR.

Then, the selection signal SEL in all the rows changes from the low level to the high level (FIG. 4(c)) and the selection transistor MSE in all the pixels PX turns on. Because of this, the amplifying transistor MAM in all the pixels PX functions as a source follower circuit. For example, the amplifying transistor MAM outputs a voltage from the source to the vertical signal line VL. The voltage is the voltage of the gate (voltage of the floating diffusion FD) being reduced by the threshold voltage of the amplifying transistor MAM. Because of this, the voltage of the vertical signal line VL rises. At this time, the voltage of the floating diffusion FD rises due to the coupling of the vertical signal line VL and the floating diffusion FD (for example, the wiring CL shown in FIG. 3) and the coupling of the selection signal line SEL and the floating diffusion FD. It should be noted that in the explanation of FIG. 4, the selection signal line SEL includes, for example, the gate of the selection transistor MSE.

After the selection signal SEL changes from the low level to the high level, the transfer signal TX in all the rows changes from the high level to the low level (FIG. 4(d)) and the transfer transistor MTR in all the pixels PX turns off. At this time, the voltage of the floating diffusion FD drops because of the coupling of the transfer signal line TX and the floating diffusion FD and charge injection as a result of the transfer transistor MTR turning off.

It should be noted that when the transfer signal TX changes from the high level to the low level, the amplifying transistor MAM is operating as a source follower circuit, and thus the apparent capacitance of the floating diffusion FD is small. Consequently, the influence of the coupling of the transfer signal line TX and the floating diffusion FD on the voltage of the floating diffusion FD is significant. Because of this, for example, the amount of voltage drop of the floating diffusion FD when the transfer signal TX changes from the high level to the low level (FIG. 4($d$)) becomes larger than the amount of voltage rise of the floating diffusion FD when the transfer signal TX changes from the low level to the high level (FIG. 4($b$).

The drop in the voltage of the floating diffusion FD causes, for example, the reset transistor MRS to turn on. Because of this, the charges of the floating diffusion FD are reset and the voltage of the floating diffusion FD is maintained at the voltage VTH. In this manner, the charges of the photodiode PD in all the pixels PX are discharged to the power supply VDD via the transfer transistor MTR and the reset transistor MRS. It should be noted that the voltage of the vertical signal line VL drops following the change in the voltage of the floating diffusion FD.

Then, the reset signal RST in the pixel PX in all the rows changes from the high level to the low level (FIG. 4($e$)) and the reset transistor MRS in all the pixels PX turns off. At this time, the voltage of the floating diffusion FD drops because of the coupling of the reset signal line RST and the floating diffusion FD and the charge injection as a result of the reset transistor MRS turning off. Meanwhile, in the explanation in FIG. 4, the reset signal RST includes, for example, the gate of the reset transistor MRS. The voltage of the vertical signal line VL drops following the change in the voltage of the floating diffusion FD.

It should be noted that when the reset signal RST changes from the high level to the low level, the amplifying transistor MAM is operating as a source follower circuit. Because of this, the apparent capacitance of the floating diffusion FD when the reset signal RST changes from the high level to the low level is small. Consequently, the influence of the coupling of the reset signal line RST and the floating diffusion FD on the voltage of the floating diffusion FD is significant. Because of this, in the embodiment, the amount of drop in the voltage of the floating diffusion FD when the reset signal RST changes from the high level to the low level is larger compared with the comparative example (when the selection signal SEL is maintained at the low level during the reset period TRST) shown by the waveform of the broken line in FIG. 4.

After the reset signal RST changes from the high level to the low level, the selection signal SEL in all the rows changes from the high level to the low level (FIG. 4($f$)) and the selection transistor MSE in all the pixels PX turns off. As a result of the selection transistor MSE turning off, the amplifying transistor MAM does not operate as a source follower circuit any more, and thus, the voltage of the vertical signal line VL drops. Then, the voltage of the vertical signal line VL is clipped at the voltage VCLP so as not to drop below the minimum voltage that can cause, for example, the constant current source IS shown in FIG. 1 to operate. At this time, the voltage of the floating diffusion FD drops because of the coupling of the vertical signal line VL and the floating diffusion FD (for example, the wiring CL shown in FIG. 3) and the coupling of the selection signal line SEL and the floating diffusion FD.

As described above, during the reset period TRST, for example, the vertical scanning circuit 30 shown in FIG. 1 causes the selection transistor MSE to change from the off state to the on state when the reset transistor MRS and the transfer transistor MTR are maintained in the on state and causes the selection transistor MSE to change from the on state to the off state after the reset transistor MRS and the transfer transistor MTR change from the on state to the off state. That is, during the reset period TRST, the selection transistor MSE is maintained in the off state when each of the transfer transistor MTR and the reset transistor MRS changes from the off state to the on state and maintained in the on state when each of the transfer transistor MTR and the reset transistor MRS changes from the on state to the off state.

During the exposure period TXEP, the reset signal RST, the transfer signal TX, and the selection signal SEL in all the rows are maintained at the low level and the reset transistor MRS, the transfer transistor MTR, and the selection transistor MSE in all the pixels PX are turned off. Because of this, the voltage of the floating diffusion FD is maintained at the final voltage (the voltage after the selection signal SEL changes from the high level to the low level) during the reset period TRST.

During the read period TRD, first, in the state where the transfer signal TX and the reset signal RST in all the rows are maintained at the low level, the selection signal SEL(1) changes from the low level to the high level (FIG. 4($g$)). It should be noted that the selection signals SEL other than the selection signal SEL in the pixel group PXG in the row (in the example in FIG. 4, the first row) to be read are maintained at the low level.

As a result of the selection signal SEL(1) changing from the low level to the high level, the selection transistor MSE in the pixel group PXG in the first row turns on and the amplifying transistor MAM in the pixel group PXG in the first row operates as a source follower circuit. Because of this, the voltage of the vertical signal line VL rises. At this time, the voltage of the floating diffusion FD rises due to the coupling of the vertical signal line VL and the floating diffusion FD (for example, the wiring CL shown in FIG. 3) and the coupling of the selection signal line SEL and the floating diffusion FD.

In particular, in the configuration in which the coupling of the vertical signal line VL and the floating diffusion FD is made relatively large in order to increase the conversion gain of the floating diffusion FD as shown in FIG. 3, the amount of rise in the voltage of the floating diffusion FD becomes large. For example, in the configuration in which the selection signal SEL is not controlled during the reset period TRST (when the selection signal SEL is maintained as the low level during the reset period TRST), the voltage of the floating diffusion FD becomes higher than the voltage VTH as shown by the waveform of the broken line in FIG. 4. In this case, even when the reset signal RST changes from the low level to the high level, the reset transistor MRS does not turn on, and thus the charges of the floating diffusion FD are not reset.

In contrast to this, in the embodiment, by controlling the selection signal SEL during the reset period TRST, the final voltage during the reset period TRST can be reduced, and thus it is possible to prevent the voltage of the floating diffusion FD from becoming higher than the voltage VTH.

After the selection signal SEL(1) changes from the low level to the high level, the reset signal RST(1) changes from the low level to the high level (FIG. 4($h$)). Meanwhile, the timing at which the reset signal RST(1) is caused to change from the low level to the high level may be the same as the timing at which the selection signal SEL(1) is caused to change from the low level to the high level.

As a result of the reset signal RST(1) changing from the low level to the high level, the reset transistor MRS in the pixel group PXG in the first row turns on and the charges of the floating diffusion FD in the pixel group PXG in the first row are reset. Because of this, the voltage of the floating diffusion FD rises up to the voltage VTH. The voltage of the vertical signal line VL rises following the change in the voltage of the floating diffusion FD. It should be noted that in the comparative example shown by the waveform of the broken line, the voltage of the floating diffusion FD rises by the coupling of the reset signal line RST and the floating diffusion FD.

After the charges of the floating diffusion FD are reset, the reset signal RST(1) changes from the high level to the low level (FIG. 4(*i*)) and the reset transistor MRS in the pixel group PXG in the first row turns off. At this time, the voltage of the floating diffusion FD in the pixel group PXG in the first row drops down to a voltage VREF by the coupling of the reset signal line RST and the floating diffusion FD and the charge injection as a result of the reset transistor MRS turning off. Then, a signal according to the voltage VREF is output to the vertical signal line VL.

For example, the amplifying transistor MAM in the pixel group PXG in the first row outputs a voltage (voltage corresponding to the signal OUTN shown in FIG. 1) to the vertical signal line VL. The voltage is the voltage VREF of the floating diffusion FD in the pixel group PXG in the first row being reduced by the threshold voltage of the amplifying transistor MAM. Meanwhile, in the comparative example shown by the waveform of the broken line, the charges of the floating diffusion FD are not reset, and thus the voltage of the floating diffusion FD is out of the range of voltage (for example, the range equal to or lower than the voltage VREF) required to cause the amplifying transistor MAM to operate normally In contrast to this, in the embodiment, the charges of the floating diffusion FD are reset when the reset signal RST(1) is at the high level, and thus it is possible to prevent the voltage of the floating diffusion FD from deviating from the range of voltage required to cause the amplifying transistor MAM to operate normally. As a result of this, in the embodiment, it is possible to prevent the operation range of the amplifying transistor from deviating from the normal operation range and to reduce the occurrence of dark shading and fixed pattern noise in an image.

After the amplifying transistor MAM outputs a signal according to the voltage VREF to the vertical signal line VL, the transfer signal TXa(1) is maintained at the high level for a fixed period of time (FIG. 4(*j*)). It should be noted that the transfer signal TXa(1) is the transfer signal TX in the pixel PX in the first row (pixel PXa in the pixel group PXG in the first row) as explained in FIG. 1.

As a result of the transfer signal TXa(1) being maintained at the high level for a fixed period of time, the transfer transistor MTR in the pixel PX in the first row turns on for a fixed period of time. Because of this, in the pixel PX in the first row, the signal charge generated by the photodiode PD is transferred to the floating diffusion FD via the transfer transistor MTR. The voltage of the floating diffusion FD drops according to, for example, the amount of signal charge transferred.

Then, the voltage of the floating diffusion FD, which has dropped according to the amount of signal charge, is output to the vertical signal line VL via the amplifying transistor MAM. For example, the amplifying transistor MAM in the pixel group PXG in the first row outputs a voltage (voltage corresponding to the signal OUTS shown in FIG. 1) to the vertical signal line VL. The voltage is the voltage of the floating diffusion FD in the pixel group PXG in the first row being reduced by the threshold voltage of the amplifying transistor MAM. Because of this, to the vertical signal line VL, a signal according to the signal charge generated in the photodiode PD in the pixel PXa in the pixel group PXG in the first row (the pixel PX in the first row) is transmitted.

Next, in order to read a signal in the pixel PX in the second row, the reset signal RST(1) changes from the low level to the high level (FIG. 4(*k*)) and the reset transistor MRS in the pixel group PXG in the first row turns on. Because of this, the charges of the floating diffusion FD in the pixel group PXG in the first row are reset and the voltage of the floating diffusion FD rises up to the voltage VTH. The voltage of the vertical signal line VL rises following the change in the voltage of the floating diffusion FD.

Then, the reset signal RST(1) changes from the high level to the low level (FIG. 4(*l*)) and the reset transistor MRS in the pixel group PXG in the first row turns off. At this time, the voltage of the floating diffusion FD in the pixel group PXG in the first row drops down to the voltage VREF as explained in FIG. 4(*i*). Then, a signal according to the voltage VREF is output to the vertical signal line VL. For example, the amplifying transistor MAM in the pixel group PXG in the first row outputs a voltage (voltage corresponding to the signal OUTN shown in FIG. 1) to the vertical signal line VL. The voltage is the voltage VREF of the floating diffusion FD in the pixel group PXG in the first row being reduced by the threshold voltage of the amplifying transistor MAM.

As described above, in the embodiment, the reset transistor MRS operates normally, and thus, for example, in the pixel PX in the first row and the second row, it is possible to adjust the voltage of the floating diffusion FD before the signal charge is transferred to the voltage VREF. That is, in the embodiment, it is possible to prevent the voltage of the floating diffusion FD before the signal charge is transferred from varying in a plurality of the pixels PX.

It should be noted that in the comparative example shown by the waveform of the broken line, the charges of the floating diffusion FD are not reset, and thus the voltage of the floating diffusion FD before the signal charge is transferred varies in the plurality of the pixels PX. In this case, the output characteristics of the amplifying transistor MAM vary in the plurality of the pixels PX, and thus dark shading and fixed pattern noise occur in an image.

In contrast to this, in the embodiment, it is possible to prevent the voltage of the floating diffusion FD from varying in the plurality of the pixels PX, and thus it is possible to prevent the output characteristics of the amplifying transistor MAM from varying in the plurality of the pixels PX. As a result of that, in the embodiment, it is possible to reduce dark shading and fixed pattern noise from occurring in an image. Furthermore, in the embodiment, it is possible to securely reset charges of the floating diffusion FD, and thus it is possible to prevent a residual image from occurring in an image continuously photographed.

After the amplifying transistor MAM outputs a signal according to the voltage VREF to the vertical signal line VL, the transfer signal TXb(1) is maintained at the high level for a fixed period of time (FIG. 4(*m*)). It should be noted that the transfer signal TXb(1) is the transfer signal TX in the pixel PX in the second row (pixel PXb in the pixel group PXG in the first row) as explained in FIG. 1. As a result of the transfer signal TXb(1) being maintained at the high level for a fixed period of time, the transfer transistor MTR in the pixel PX in the second row turns on for a fixed period of time. Because of this, in the pixel PX in the second row, the signal charge generated by the photodiode PD is transferred to the floating diffusion FD via the transfer transistor MTR. The voltage of the floating diffusion FD drops according to, for example, the amount of signal charge transferred.

The voltage of the floating diffusion FD, which has dropped according to the amount of signal charge, is output to the vertical signal line VL via the amplifying transistor MAM. For example, the amplifying transistor MAM in the pixel group PXG in the first row outputs a voltage (voltage corresponding to the signal OUTS shown in FIG. 1) to the vertical signal line VL. The voltage is the voltage of the floating diffusion FD in the pixel group PXG in the first row being reduced by the threshold voltage of the amplifying transistor MAM. Because of this, to the vertical signal line VL, a signal according to the signal charge generated in the photodiode PD in the pixel PXb in the pixel group PXG in the first row (the pixel PX in the second row) is transmitted.

Then, the selection signal SEL(1) changes from the high level to the low level (FIG. 4(n)) and the selection transistor MSE in the pixel group PXG in the first row turns off. Because of this, the read operation of the pixel group PXG in the first row is completed. Next, for example, the read operation of the pixel group PXG in the second row (the pixel PX in the third row and the fourth row) is started. When the read operation of the pixel group PXG in the n-th row has been completed, the operation of the read period TRD is completed. It should be noted that in the pixel group PXG in the row to be read, the control signals RST, TXa, TXb, and SEL in the pixel group PXG in the row to be read are controlled in the same manner as the control signals RST(1), TXa(1), TXb(1), and SEL(1) in the read operation of the pixel group PXG in the first row.

Figure 5:
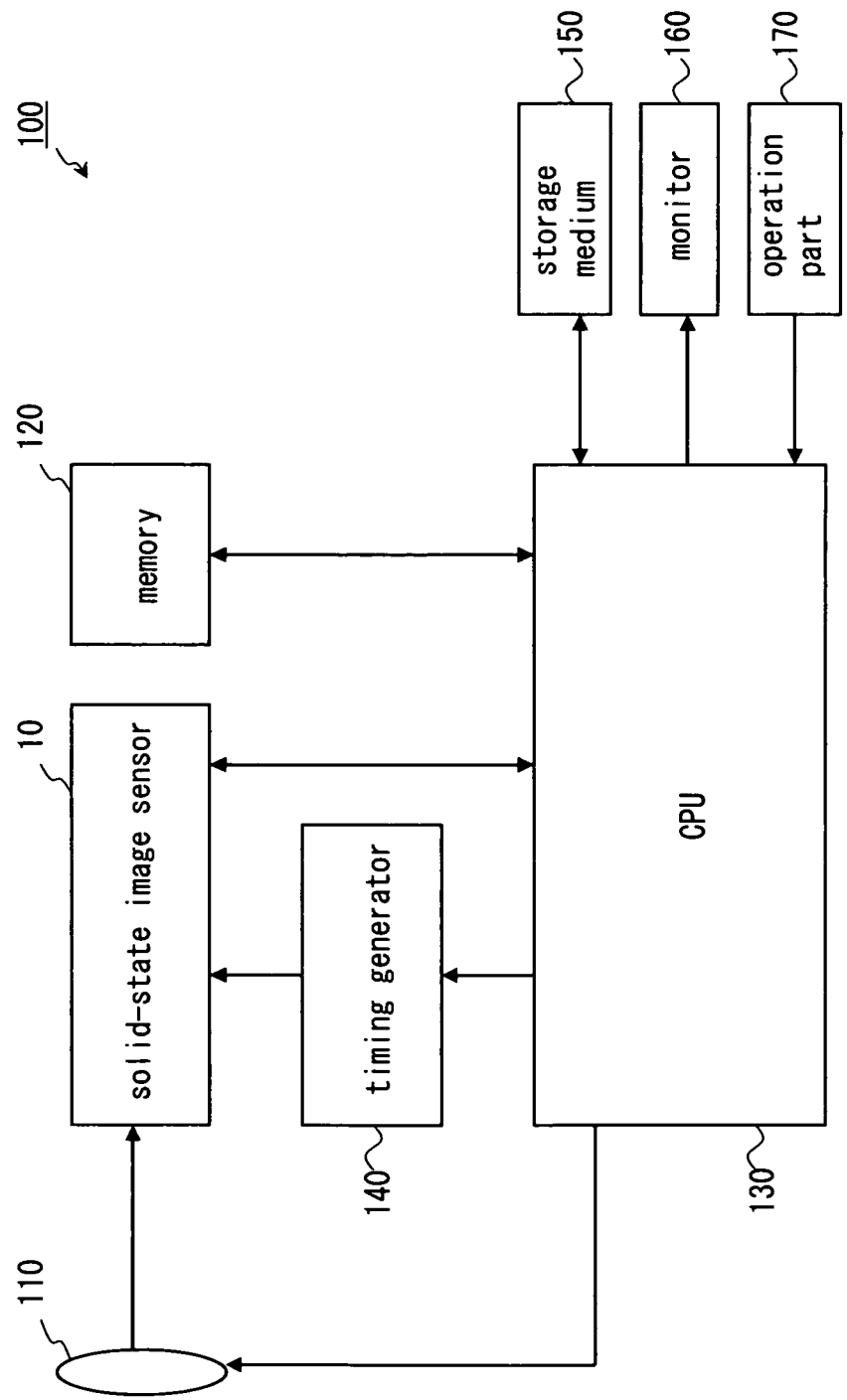
FIG. 5 is a diagram showing an example of an imaging apparatus configured by using the solid-state image sensor shown in FIG. 1.

FIG. 5 shows an example of an imaging apparatus 100 configured by using the solid-state image sensor 10 shown in FIG. 1. The imaging apparatus 100 is, for example, a digital camera, and has the solid-state image sensor 10, an imaging lens 110, a memory 120, a CPU 130, a timing generator 140, a storage medium 150, a monitor 160, and an operation part 170.

The imaging lens 110 forms an image on a light receiving surface of the solid-state image sensor 10. The memory 120 is, for example, a built-in memory formed by a DRAM (Dynamic RAM) or SRAM (Static RAM) and temporarily stores image data etc. of an image photographed by the solid-state image sensor 10. The CPU 130 is, for example, a microprocessor and controls the operation of the solid-state image sensor 10, the imaging lens 110, etc., based on a program, not shown schematically. For example, the CPU 130 performs autofocus control, aperture control, exposure control to the solid-state image sensor 10, recording of image data, etc. It should be noted that the exposure control to the solid-state image sensor 10 includes, for example, control to open/close a mechanical shutter (not shown schematically) etc.

The timing generator 140 is controlled by the CPU 130 and supplies a driving clock etc. to the solid-state image sensor 10. For example, the timing generator 140 supplies a driving clock etc. of the vertical scanning circuit 30 and the horizontal scanning circuit 40 shown in FIG. 1 to the solid-state image sensor 10. It should be noted that the timing generator 140 may be provided within the CPU 130 or provided within the solid-state image sensor 10. The storage medium 150 stores image data etc. of a photographed image. The monitor 160 is, for example, a liquid crystal display and displays a photographed image, an image stored in the memory 120, an image stored in the storage medium 150, a menu screen, etc. The operation part 170 has a release button and other various switches and is operated by a user to operate the imaging apparatus 100.

As described above, in the embodiment, the solid-state image sensor 10 has the vertical scanning circuit 30 that maintains the selection transistor MSE in the on state when the state of the reset transistor MRS during the reset period TRST changes from the on state to the off state. That is, during the reset period TRST, the vertical scanning circuit 30 controls the reset transistor MRS and the selection transistor MSE so that the selection transistor MSE is in the on state when the reset transistor MRS changes from the on state to the off state. Furthermore, a part of the wiring CL of the floating diffusion FD is arranged adjacent to and parallel to the vertical signal line VL. Because of this, in the embodiment, it is possible to reduce the final voltage during the reset period TRST and to cause the reset transistor MRS to operate normally during the read period TRD.

As a result of this, in the embodiment, it is possible to prevent the operation range of the amplifying transistor MAM from deviating from the normal operation range and to reduce dark shading and fixed pattern noise from occurring in an image. Furthermore, in the embodiment, it is possible to cause the reset transistor MRS to operate normally, and thus it is possible to prevent the voltage of the floating diffusion FD from varying in the plurality of the pixels PX. Because of this, in the embodiment, it is possible to prevent the output characteristics of the amplifying transistor MAM from varying in the plurality of the pixels PX and the image quality can be improved.

Figure 6:
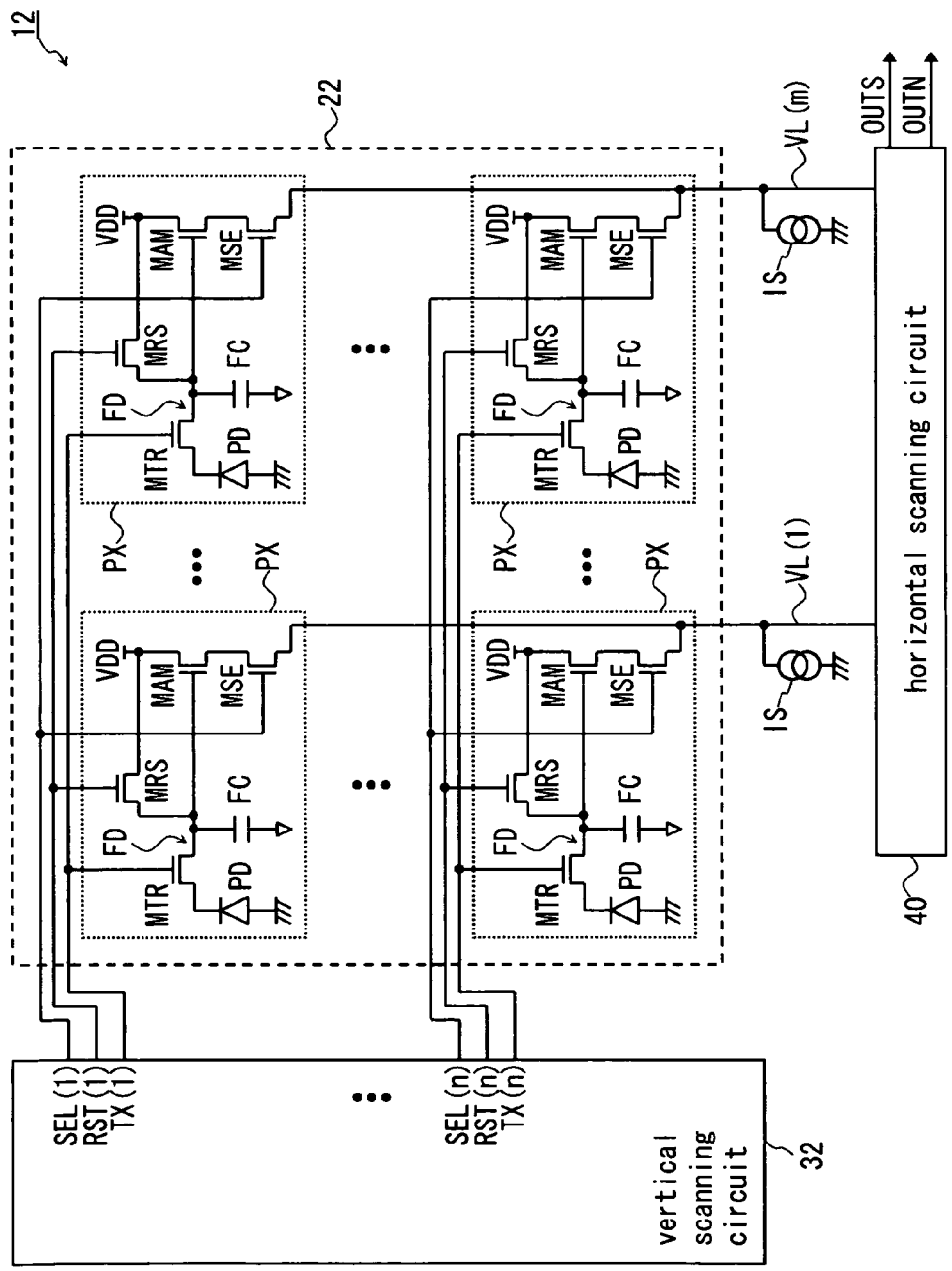
FIG. 6 is a diagram showing an outline of a solid-state image sensor in another embodiment.

FIG. 6 shows an outline of a solid-state image sensor 12 in another embodiment. The solid-state image sensor 12 in the embodiment is provided with a vertical scanning circuit 32 and a pixel array 22, respectively, in place of the vertical scanning circuit 30 and the pixel array 20 shown in FIG. 1. Other configurations of the solid-state image sensor 12 are the same as those in the embodiment explained in FIG. 1 to FIG. 5. Furthermore, the configuration of an imaging apparatus in which the solid-state image sensor 12 is mounted is the same as that of the imaging apparatus 100 shown in FIG. 5 except that the solid-state image sensor 12 is provided in place of the solid-state image sensor 10 shown in FIG. 5. The same components as those explained in FIG. 1 to FIG. 5 are assigned the same symbols and their detailed explanation is omitted. It should be noted that a capacitor FC in the drawing represents a capacitor formed in the drain region of the transfer transistor MTR.

The pixel array 22 has a plurality of the pixels PX arranged in the form of a two-dimensional matrix having n rows and m columns. Each pixel PX has the photodiode PD as a photoelectric conversion part, the transfer transistor MTR, the amplifying transistor MAM, the selection transistor MSE, the reset transistor MRS, and the floating diffusion FD. It should be noted that in the embodiment, the photodiode PD, the transfer transistor MTR, the amplifying transistor MAM, the selection transistor MSE, the reset transistor MRS, and the floating diffusion FD are provided in each pixel PX. That is, each pixel PX has the same configuration as that in which, for example, the photodiode PDb, the transfer transistor MTRb, and the capacitor FC2 are omitted from the pixel group PXG shown in FIG. 2.

The vertical scanning circuit 32 controls the pixel PX in the pixel array 22 for each row using the selection signal SEL, the reset signal RST, and the transfer signal TX. For example, if the transfer signal TX in FIG. 6 is made to correspond to the transfer signal TXa in FIG. 2, the operation of the solid-state image sensor 12 is the same as the operation of the solid-state image sensor 10 shown in FIG. 4 from which the control of the transfer signal TXb is omitted except for the control of the reset signal RST during the read period TRD. Meanwhile, during the read period TRD of the solid-state image sensor 12, the control of the reset signal RST is the control of the reset signal RST shown in FIG. 4 from which the control corresponding to the read of the pixel PXb is omitted (for example, FIG. 4(k, l)).

Figure 7:
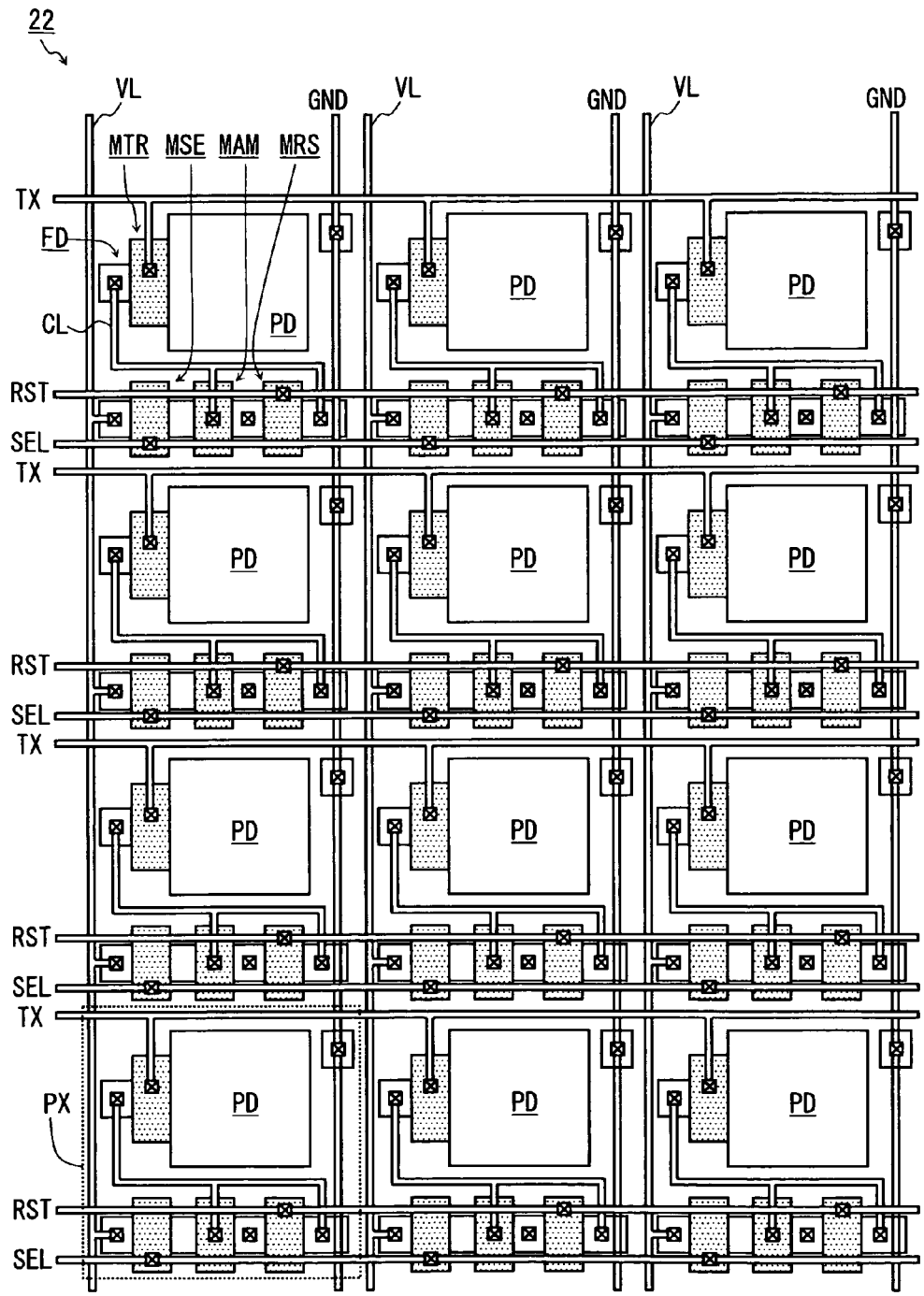
FIG. 7 is a diagram shoring an example of a layout of the pixels shown in FIG. 6.

FIG. 7 shows an example of the layout of the pixels PX shown in FIG. 6. It should be noted that FIG. 7 shows a region corresponding to four longitudinal pixels×three transverse pixels. The hatched part in the diagram represents the gate of the transistor and the rectangle attached with the x mark represents the contact region. Meanwhile, in FIG. 7, in order to make the diagram easier-to-see, the description of the wiring of the power supply VDD connected to the drain of the transistors MAM, MRS is omitted.

The layout of the pixels PX shown in FIG. 7 is basically the same as the layout of the pixels PX shown in FIG. 3 except that the selection transistor MSE, the amplifying transistor MAM, and the reset transistor MRS are arranged in each pixel PX. For example, each pixel PX has the wiring CL that connects the floating diffusion FD (for example, the drain of the transfer transistor MTR) to the gate of the amplifying transistor MAM and the source of the reset transistor MRS.

Then, a part of the wiring CL is arranged adjacent to and parallel to the vertical signal line VL extending in the direction of the column (in the longitudinal direction in FIG. 7). For example, on one of the sides of the vertical signal line VL, the wiring CL is arranged and on the other side of the vertical signal line VL, the wiring of the ground voltage GND is arranged. It should be noted that the vertical signal line VL is connected to the source of the selection transistor MSE in the pixel PX having the wiring CL adjacent to the vertical signal line VL.

Because of the above, in the embodiment, it is possible to increase the conversion gain of the floating diffusion FD. It should be noted that in the embodiment, the same control as that in the operation shown in FIG. 4 is performed, and thus it is possible to reduce the final voltage during the reset period TRST and to cause the reset transistor MRS to operate normally during the read period TRD. As described above, in the embodiment also, it is possible to obtain the same effect as that in the above-mentioned embodiment.

Meanwhile, in the above-mentioned embodiments, the example is described, in which the transistors MTR, MAM, MSE, MRS are nMOS transistors. The present invention is, however, not limited to the embodiments. For example, the transistors MTR, MAM, MSE, MRS may be pMOS transistors. In this case, the operation of the control signals RST, TX, SEL can be explained by replacing the high level and the low level of the operation shown in FIG. 4 with the low level and the high level, respectively. In this case also, it is possible to obtain the same effect as that in the above-mentioned embodiments.

In the above-described embodiments, the example is described, in which the selection transistor MSE changes from the off state to the on state when the transfer transistor MTR is maintained in the on state. The present invention is, however, not limited to the embodiments. For example, it may also be possible for the vertical scanning circuit 30 to cause the selection transistor MSE to change from the off state to the on state before the transfer transistor MTR changes from the off state to the on state. Alternatively, it may also be possible for the vertical scanning circuit 30 to cause the selection transistor MSE to change from the off state to the on state after the transfer transistor MTR changes from the on state to the off state. That is, the selection transistor MSE may change from the off state to the on state when the transfer transistor MTR is maintained in the off state. In this case also, the apparent capacitance of the floating diffusion FD when the reset transistor MRS changes from the on state to the off state can be reduced, and thus it is possible to obtain the same effect as that in the above-described embodiments.

In the above-described embodiments, the example is described, in which the selection transistor MSE changes from the off state to the on state when the reset transistor MRS is maintained in the on state. The present invention is, however, not limited to the above-described embodiments. For example, it may also be possible for the vertical scanning circuit 30 to cause the selection transistor MSE to change from the off state to the on state before the reset transistor MRS changes from the off state to the on state. That is, it is only required for the selection transistor MSE to be maintained in the on state when the reset transistor MRS changes from the on state to the off state. In this case also, the apparent capacitance of the floating diffusion FD when the reset transistor MRS changes from the on state to the off state can be reduced, and thus it is possible to obtain the same effect as that in the above-mentioned embodiments.

Figure 8:
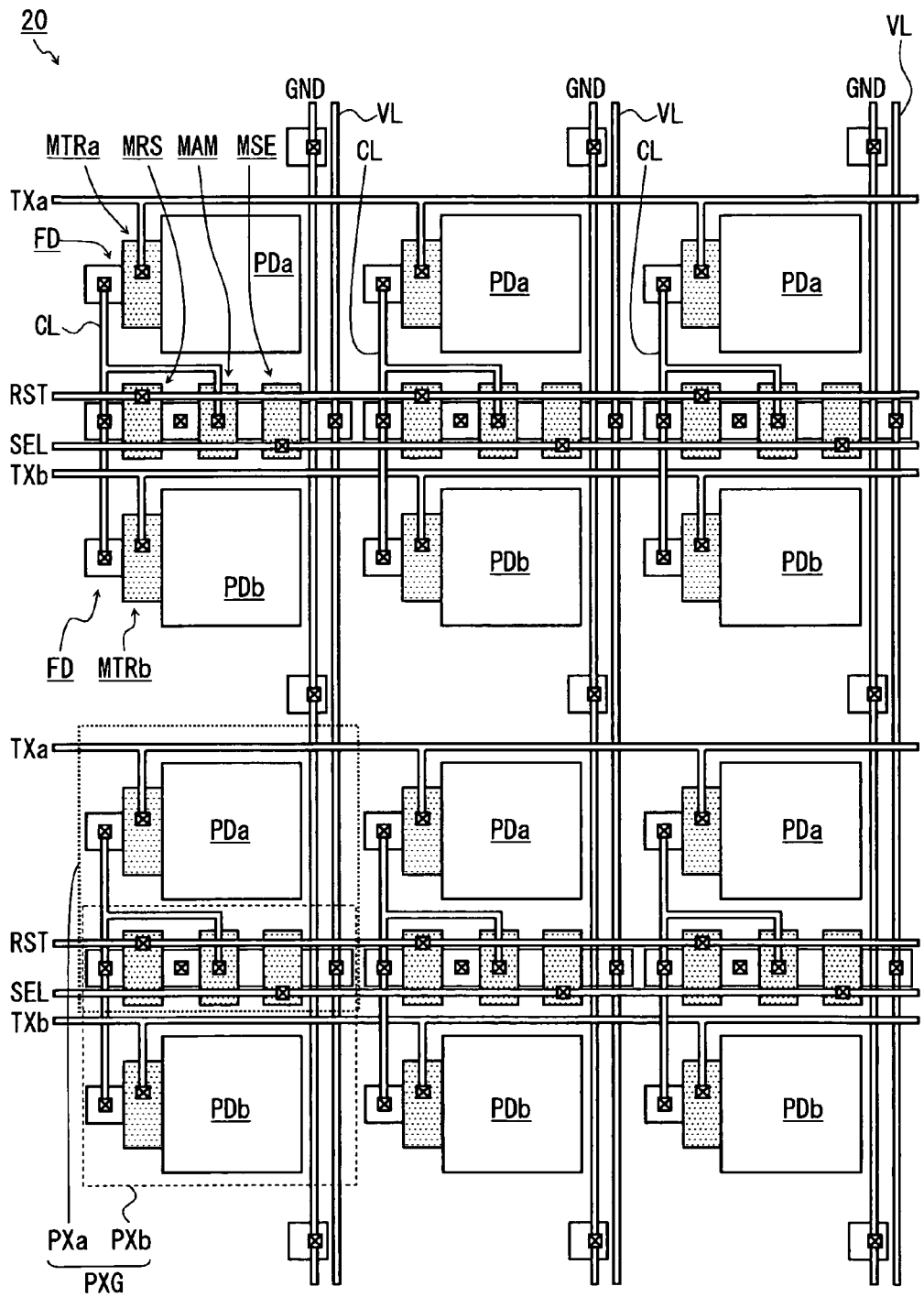
FIG. 8 is a diagram showing a modification of the layout of the pixels shown in FIG. 3.
Figure 9:
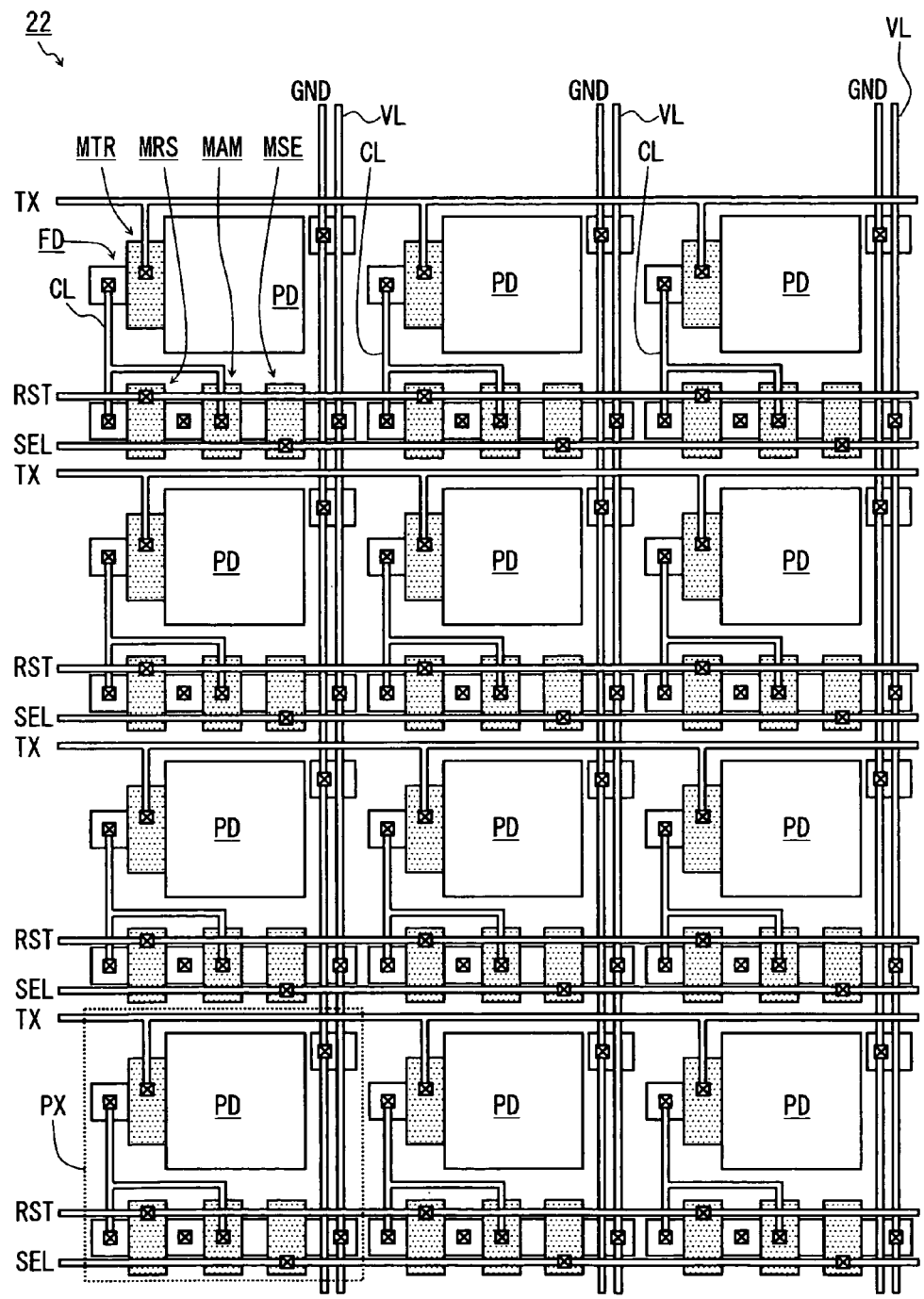
FIG. 9 is a diagram showing a modification of the layout of the pixels shown in FIG. 7.

In the above-mentioned embodiments, the example is described, in which the vertical signal line VL is connected to the source of the selection transistor MSE in the pixel PX having the wiring CL adjacent to the vertical signal line VL. The present invention is, however, not limited to the embodiments. For example, as shown in FIG. 8 and FIG. 9, the vertical signal line VL may be connected to the source of the selection transistor MSE in the pixel PX in a column different from the column of the pixel PX having the wiring CL adjacent to the vertical signal line VL. Because the operation during the reset period TRST is the same in all the pixels PX, it is possible to, in this case also, reduce the final voltage during the reset period TRST. Consequently, in this case also, it is possible to obtain the same effect as that in the above-described embodiments.

FIG. 8 shows a modification of the layout of the pixels PX shown in FIG. 3. FIG. 9 shows a modification of the layout of the pixels PX shown in FIG. 7. In the examples shown in FIG. 8 and FIG. 9, the selection transistor MSE, the amplifying transistor MAM, and the reset transistor MRS are arranged side by side in the transverse direction in the diagram in opposite order of the selection transistor MSE, the amplifying transistor MAM, and the reset transistor MRS shown in FIG. 3 (FIG. 7). Because of this, a part of the wiring CL is arranged adjacent to and parallel to the vertical signal line VL in a column different from the column of the pixel PX including the wiring CL. In this case also, it is possible to obtain the same effect as that in the above-described embodiments.

In the above-described embodiments, the example has is described, in which the exposure of the photodiode PD is controlled by the mechanical shutter. The present invention is, however, not limited to the embodiments. For example, the exposure of the photodiode PD may be controlled by a global electronic shutter etc. In this case also, it is possible to obtain the same effect as that in the above-described embodiments.

The many features and advantages of the embodiments are apparent from the detailed specification and, thus, it is intended by the appended claimed to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A solid-state image sensor comprising:
a pixel having a photoelectric conversion part which converts light into a charge, a charge-voltage conversion part which converts the charge transferred from the photoelectric conversion part into a voltage, a transfer transistor which transfers the charge of the photoelectric conversion part to the charge-voltage conversion part, an amplifying transistor which generates a signal based on a voltage of the charge-voltage conversion part, a selection transistor which selects whether or not to output a signal from the amplifying transistor, a reset transistor which resets a charge of the charge-voltage conversion part, and connection wiring which connects the charge-voltage conversion part to the amplifying transistor and the reset transistor;

a vertical signal line which transmits a signal output from the amplifying transistor; and a control unit which controls the reset transistor and the selection transistor so that the selection transistor is in the on state when the reset transistor changes from the on state to the off state during a reset period in which a charge of the photoelectric conversion part is reset.

2. The solid-state image sensor according to claim 1, wherein at least a part of the connection wiring is arranged adjacent to and parallel to the vertical signal line.

3. The solid-state image sensor according to claim 1, wherein the control unit causes the selection transistor to change from the off state to the on state after the reset transistor changes from the off state to the on state and causes the selection transistor to change from the on state to the off state after the reset transistor changes from the on state to the off state during the reset period.

4. The solid-state image sensor according to claim 1, wherein the control unit controls the on/off state of the transfer transistor, and the control unit causes the selection transistor to change from the off state to the on state after causing the transfer transistor to change from the off state to the on state and causes the selection transistor to change from the on state to the off state after causing the transfer transistor to change from the on state to the off state during the reset period.

5. The solid-state image sensor according to claim 1, wherein the control unit controls the on/off state of the transfer transistor, and the control unit causes the selection transistor to change from the off state to the on state after causing the reset transistor and the transfer transistor to change from the off state to the on state and causes the selection transistor to change from the on state to the off state after causing the reset transistor and the transfer transistor to change from the on state to the off state during the reset period.

6. The solid-state image sensor according to claim 1, comprising a pixel group including a plurality of the pixel, wherein the photoelectric conversion part and the transfer transistor are provided in each of the pixels, and the charge-voltage conversion part, the amplifying transistor, the selection transistor, the reset transistor, and the connection wiring are provided in each of the pixel group and shared by the pixels constituting the pixel group.

7. The solid-state image sensor according to claim 6, wherein the control unit controls the on/off state of the transfer transistor, and the control unit causes the selection transistor to change from the off state to the on state after causing the reset transistor and the transfer transistor to change from the off state to the on state and causes the selection transistor to change from the on state to the off state after causing the reset transistor and the transfer transistor to change from the on state to the off state during the reset period.

8. The solid-state image sensor according to claim 6, wherein the charge-voltage conversion part includes a diffusion region in which a drain of the transfer transistor is formed, and a plurality of the diffusion regions are connected to one another by the connection wiring in the pixel group and the connection wiring of the part which connects the diffusion regions to one another is arranged adjacent to and parallel to the vertical signal line.

* * * * *